Sept. 6, 1932.  G. RAUSCH  1,876,022
DOUGH DIVIDING AND KNEADING MACHINE
Filed Sept. 21, 1929   2 Sheets-Sheet 1
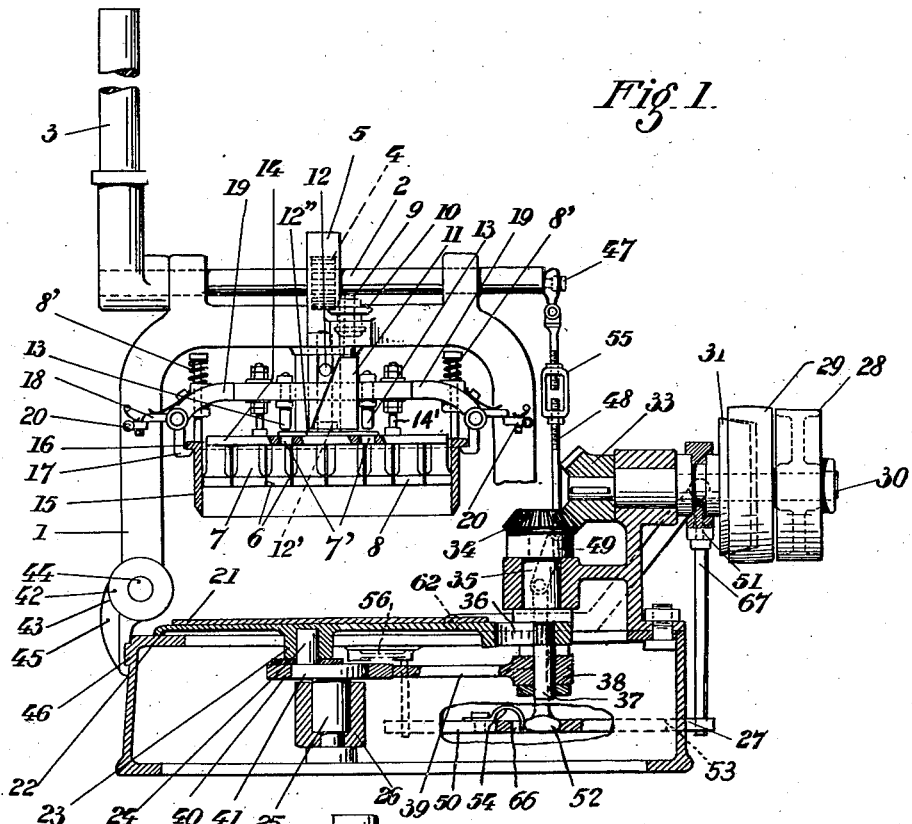
Fig. 1.
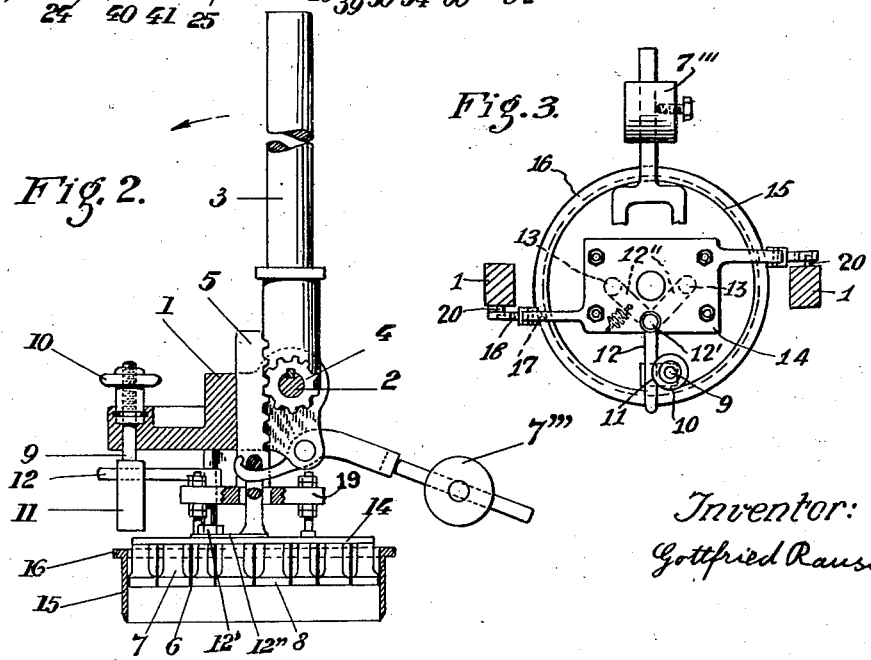
Fig. 2.
Fig. 3.
Inventor:
Gottfried Rausch Sept. 6, 1932.  G. RAUSCH  1,876,022
DOUGH DIVIDING AND KNEADING MACHINE
Filed Sept. 21, 1929  2 Sheets-Sheet 2
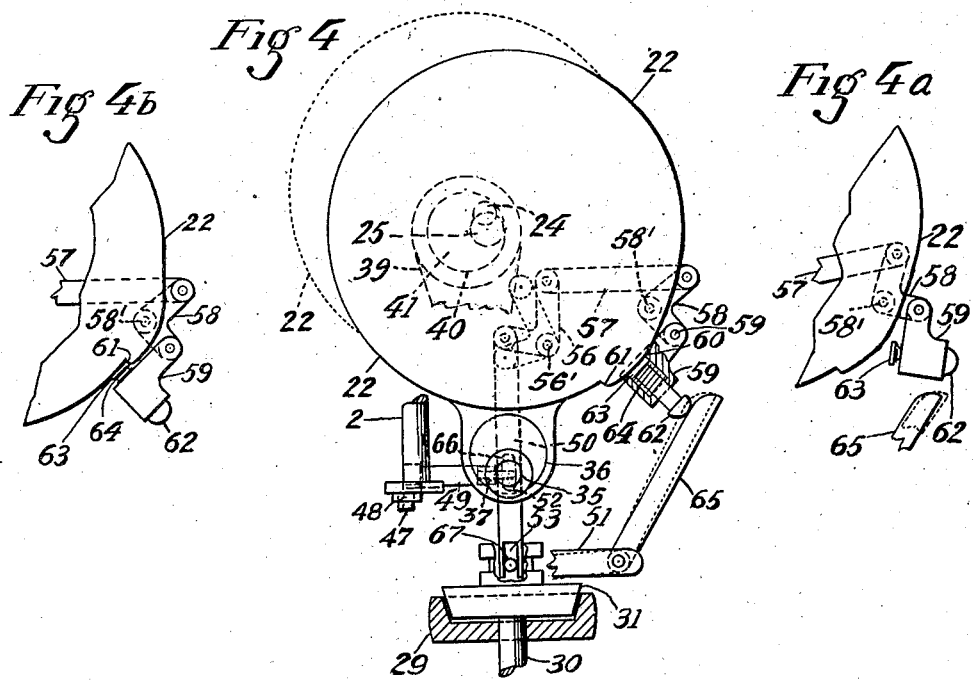
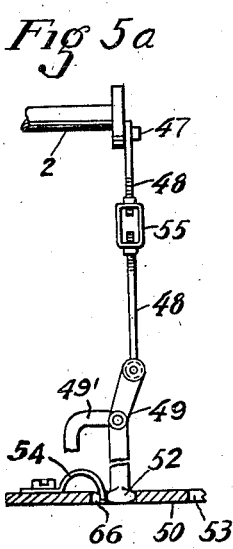
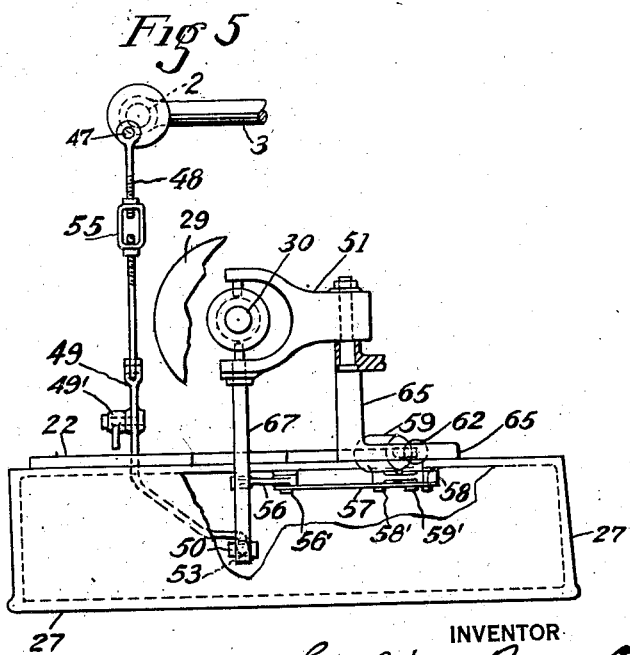
INVENTOR
Gottfried Rausch
BY Sydney Prescott
ATTORNEY positing plate 21, resting on a table plate 22 and detachably secured thereto by any suitable means, not shown, has a rotary movement imparted thereto for the purpose of kneading the dough. Machines of this character can be constructed very simply. For this purpose the table plate 22 is fitted by means of a tubular extension 23 over the eccentric pin 24 of a short vertical shaft 25 which at 26 is mounted in the casing like lower portion 27 of the machine.

The rotary movement of the table plate 22 and dough depositing plate 21 is produced by a shaft 30 preferably provided with fast and loose pulleys 29, 28. The fast pulley is formed as one half of a conical clutch of which the axially movable conical body 31, of which the actuation is described hereinafter, rotates the shaft 30 when engaged. This rotation is for example transmitted by the bevel gear 33 keyed on shaft 30 and meshing with a bevel gear 34 on the vertical shaft 35 mounted in the casing 27. On this shaft 35 there is keyed an eccentric 36 carrying the crank pin 37. The eccentric 36 rotates in a suitably shaped slot 38 in table plate 22 whereas pin 37 is engaged by a short eccentric rod 39 provided with an eccentric strap 40 on the eccentric 41 on the shaft 25.

On this casing, surrounding this kneading mechanism, which itself may be provided with a support or may be mounted on a suitable wooden or metal support, there is secured the frame 1 of the upper portion preferably by means of apertured lugs 42 provided on the frame 1 and apertured lugs 43 provided on the casing 27, through which passes a bolt 44 so that by releasing this bolt for the purpose of cleaning the machine, the strap shaped upper portion can be tilted to one side. At least the extension 45 carrying the apertured lug 43 of the lower portion 21 is detachably secured at 46 to this casing 27 in such a manner that it is possible to connect an upper portion 1 of any existing size with the gear casing 27 by replacing the extension 45 by one of different dimensions.

In addition to the releasing mechanism 16 to 20 for the casing ring 15 and 11 to 13 for the press plate frame 7 the following devices are also set in operation when actuating the hand lever 3.

After the completion of the cutting of the dough the above mentioned movable half 31 of the kneading clutch is engaged. This is effected by means of a crank pin 47 of the shaft 2, with which engages a rod 48 by means of which a thrust rod 50 is actuated by means of a bell crank lever 49. The bell crank lever 49 engages with its rounded end 52 in the slot 66 of the thrust rod 50. In order that the shocks, which are applied to the member 59, hereinafter described when disengaging the kneading clutch may be prevented from being transmitted to the rod the rounded end 52 engages with play in the slot 66 and is pressed against the outer end of the slot by the blade spring 54 so that the clutch yoke 51 is moved by a rod 67 having its upper end attached to the clutch yoke and positively engaging with a yoke 53 of the thrust rod, in such a manner that it presses the loose conical part 31 of the clutch into the hollow conical clutch half of the driving pulley 29. In this manner the dough depositing plate 21 is set in rotation. The thrust rod 50 only moves the rod 67 in the direction of engagement. On the return movement of the thrust rod 50 the rod 67 and thus the clutch fork 51 are not moved, therefore the clutch remains in engagement, as in this direction the end of the yoke 53 is open.

For the purpose of fine adjustment of the clutch the rod 48 is preferably provided with a turn buckle 55 having a right and left hand thread whereby the rod 48 can be lengthened or shortened as may be required.

In order that the rotary dough depositing plate 21 may always come to rest at the same point of its rotary movement at the completion of the kneading process, which is essential for the correct introduction of the lump of dough for the dough dividing and pressing operation, the machine is preferably provided with the following device. The kneading is stopped by lifting the hand lever 3. This causes the rod 48 to move the bell crank lever 49 supported on the casing 27 by bracket 49' in the opposite direction. The thrust rod 50 through the medium of the bell crank lever 56 on pin 56' on the casing 27 and the rod 57 moves the lever member 58 on pin 58' also on the casing 27 with its part 59 fixed to lever 58 by pin 59' into the range of oscillation of the dough depositing plate 21. The dough depositing plate 21 is preferably provided at its periphery with a wedge shaped surface 60, and if desired also with a stop 61. The part 59 of the lever 58 carries a stop bolt 62 arranged at right angles to the periphery of the dough depositing plate 21 of which the end 63 is constantly pressed in the direction of the dough depositing plate by a spring 64 mounted on the stop 62. During the kneading the member 58 is in such a position that stop bolt 62 in its part 59 does not come within the path of the rotating dough depositing plate. Only on the upward movement of the hand lever 3 from its lowermost position, that is to say at the commencement of the disengagement of the kneading movement, the part 59 and thus also the end 63 of the stop bolt 62 come into the path of the wedge surface 60 oscillating with the dough depositing plate 21.

This moves the head of the stop bolt outwardly against a lever 65 rigidly connected to the clutch fork 51 in such a manner that the clutch 31, 29 is thus disengaged. The stop 61 now bears against the part 59 of the member 58 and thus frictionally holds the dough depositing plate 21 at a very definite position. In order to reduce the shock on the impact of the stop 61 against the part 59 the stop 61 or the part 59 is preferably provided with a rubber or spring buffer.

The method of operation of the machine is as follows. After the driving belt has been moved from the loose pulley 28 to the fast pulley 29 serving as a clutch half and a dough depositing plate with the lump of dough to be operated upon, has been placed on the table plate 22 the lever 3 is moved downwardly from its highest position. During this operation the bell crank levers 18 first come into engagement with the stops 20 so that the pawls 17 of the levers 18 release the casing ring 15. It falls downwards and surrounds from the outside the lumps of dough. On the further downward movement of the lever 3 the dough pressing plate 8 of the press plate frame 7 comes in contact with the dough and presses it into the form of a shallow cylinder. The wedge shaped member 11 is so adjusted by means of the hand wheel 10 and the spindle 9 so that the pressure on the lumps of dough which have been previously weighed is released when the pins enter the openings 7' in the plate 14 so that the press plate frame 7 is released by means of the member 11 at the correct position of the rack 5, that is to say at the end of pressing.

The lever is now further depressed without stopping whereby the press plate frame 7, the weight of which is conterbalanced by the counter weight 7''', remains resting on the pressed dough. By the downward movement of the lever 3 the dough dividing cutters engage with the pressed dough and divide it into equal pieces. As soon as the dividing cutters 6 come in contact with the dough depositing plate 21 or shortly previous thereto the kneading clutch 31 and 29 is engaged by means of parts 47 to 54. The kneading now takes place as long as required until the lever 3 which is now in its lowermost position is again raised.

By this upward movement the clutch 31—29 is disengaged and the dough depositing plate 21 is brought to rest by means of the stop device 59, 61 at a definite position of the rotary movement and the kneading clutch 31, 29 is released by the parts 60, 62, 65. On the further upward movement of the lever 3 the press plate frame 7 is moved upwardly into engagement with the pins 13. Finally the pawls 17 also engage under the rim 16 of the casing ring 15 and raise this. The stops 20 yield upwardly for this purpose. The lever 3 is now returned to its uppermost or initial position in which all the parts return to their original position, the pressing mould being therefore fully open so that the completed dough portions together with the dough depositing plate 21 are removed from the machine and a fresh dough depositing plate with the dough lumps to be operated upon can be brought into the machine.

It will be understood that the entire operation of the machine is limited solely to the upward and downward movements of the hand lever 3 as all the remaining movements of the machine are produced automatically by this lever movement. The operation of the machine is therefore simple, the machine cannot be actuated incorrectly, and the operation is very rapid as it is not necessary for the operator to direct attention to other handles or actuating levers.

It will be understood that the kneading mechanism located in the casing 27 can also be assembled with a dough dividing and pressing device which is not operated in the manner above described by a hand lever 3, whilst this automatic control of the operation by means of a hand lever may also be assembled with any other suitable kneading mechanism.

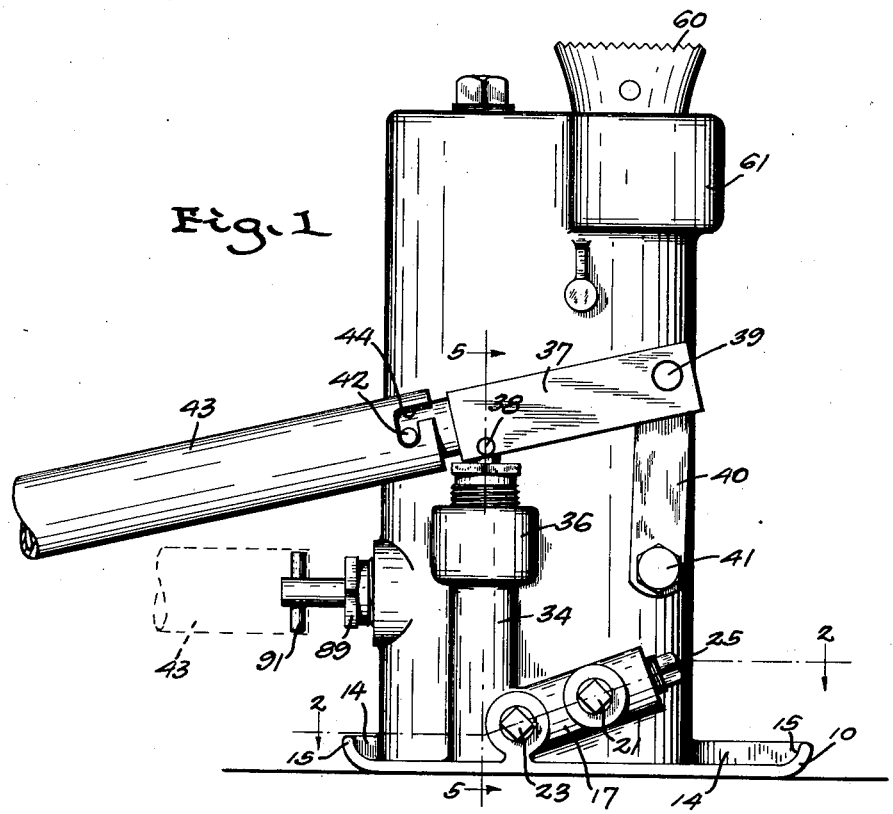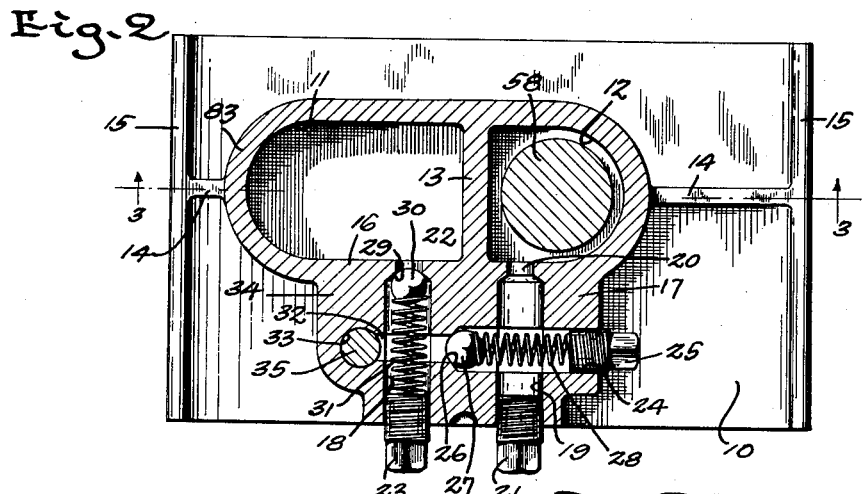

I claim:—

1. The combination with the dough dividing means of a dough dividing and kneading machine, of a rotatable table plate and a dough depositing table removably supported by said plate for supporting and kneading the dough and a stop for frictionally engaging the dough depositing plate.

2. The combination with the dough dividing and pressing means of a dough dividing and kneading machine including a casing ring for surrounding the dough, of a rotatable dough depositing table for supporting and kneading the dough, releasable means for supporting said casing ring, and means also supporting said ring for cushioning its falling movement when it is released.

3. The combination with the dough dividing mechanism of a dough dividing and kneading machine, of means for setting said mechanism into operation, a rotatable dough depositing table for supporting and kneading the dough, and mechanism for rotating said table, said mechanism including a clutch and means connected to the clutch and operated by the table to open the clutch.

4. The combination with the dough dividing mechanism of a dough dividing and kneading machine, of means for setting said mechanism into operation, a rotatable dough depositing table for supporting and kneading the dough, and mechanism for rotating said table, said means including a rack connected to the dividing mechanism and a hand lever for operating said rack, and the mechanism for rotating said table including a clutch connected to said hand lever and arranged to be closed by operation of said lever.

5. The combination with the dough depositing table of a dough dividing and kneading machine for supporting and kneading the dough, of means for driving said table, and means for stopping said table in a definite position, said stopping means including a spring pressed stop engaging the table.

6. In a dough dividing and kneading machine, the combination with means for dividing the dough, of means for pressing the dough, a rotatable dough depositing plate for supporting and kneading the dough, a manually operable single lever connected only to said dividing means to move it to and from dough dividing position, normally operative means supported by said dividing means for moving said dough pressing means into operative position, a stationary wedge member for actuating said normally operative means to cause it to stop moving, said dough pressing means, and means connected to and controlled from said lever for rotating said dough depositing plate.

7. In a dough dividing and kneading machine, the combination with means for dividing the dough, of means for pressing the dough, a rotatable dough depositing plate for supporting and kneading the dough, a manually operable single lever connected only to said dividing means to move it to and from dough dividing position, normally operative means supported by said dividing means for moving said dough pressing means into operative position, a stationary wedge member for actuating said normally operative means to cause it to stop moving said dough pressing means, and means connected to and controlled from said lever for rotating said dough depositing plate, said dough dividing means including a transverse bar, a rack fixed to said bar and geared to said lever and dough dividing cutters fixed to said bar.

8. In a dough dividing and kneading machine, the combination with means for dividing the dough, of means for pressing the dough, a rotatable dough depositing plate for supporting and kneading the dough, a manually operable single lever connected only to said dividing means to move it to and from dough dividing position, normally operative means supported by said dividing means for moving said dough pressing means into operative position, a stationary wedge member for actuating said normally operative means to cause it to stop moving said dough pressing means, and means connected to and controlled from said lever for rotating said dough depositing plate, said dough dividing means including a transverse bar connected to said lever, and said dough pressing means including a press plate frame supported from said bar and carrying a perforated plate on its top, and said normally operative means including a forked lever normally covering the perforations in said plate and adapted to be swung into position to uncover the perforations in said plate by engagement with said wedge member, and pins carried by said transverse bar in alignment with said perforations.

9. In a dough dividing and kneading machine, the combination with means for dividing the dough, of means for pressing the dough, a rotatable dough depositing plate for supporting and kneading the dough, a manually operable single lever connected only to said dividing means to move it to and from dough dividing position, normally operative means supported by said dividing means for moving said dough pressing means into operative position, a stationary wedge member for actuating said normally operative means to cause it to stop moving said dough pressing means, and means connected to and controlled from said lever for rotating said dough depositing plate, said means for rotating the dough depositing table including a clutch operated from said lever.

10. The combination with means for dividing dough, of means for pressing dough, a manually operable single lever connected only to said dividing means to move it to and from dough dividing position, normally operative means supported by said dough dividing means for moving said dough pressing means into operative position, and a stationary wedge member for actuating said normally operative means to cause it to stop moving said dough pressing means into operative position.

11. The combination with a rotatable dough depositing table, of a maually operable single lever, and means connected to and controlled from said lever for rotating said table, said means including a clutch drive for said table, said clutch drive including a clutch member having a clutch yoke, a slotted thrust rod having a yoke in its outer end, a bell crank lever connected to said single lever at its upper end and having its lower end disposed in the slot in said thrust rod, a rod disposed in the yoke in the outer end of said thrust rod, and means for stopping said clutch drive.

12. The combination with a rotatable dough depositing table, of a manually operable single lever, and means connected to and controlled from said lever for rotating said table, said means including a clutch drive for said table, said clutch drive including a clutch member having a clutch yoke, a slotted thrust rod having a yoke in its outer end, a bell crank lever connected to said single lever at its upper end and having its lower end disposed in the slot in said thrust rod, a rod disposed in the yoke in the outer end of said thrust rod, and means for stopping said clutch drive, said dough depositing plate being provided with a wedge shaped surface on its periphery, and said stopping means including a lever rigidly connected to said clutch yoke, linkage connected to said bell crank lever, and a stop bolt carried by said linkage and adapted to engage the wedge shaped portion on said table and the lever rigidly secured to said clutch yoke for disengaging said clutch drive and frictionally stopping the rotation of said table.

GOTTFRIED RAUSCH.